United States Patent [19]

Poujol

[11] 4,399,838

[45] Aug. 23, 1983

[54] HEATING CONTROL COCK

[75] Inventor: Yves Poujol, Noisy le Roi, France

[73] Assignee: Valeo, Paris, France

[21] Appl. No.: 242,482

[22] Filed: Mar. 11, 1981

[30] Foreign Application Priority Data

Mar. 31, 1980 [FR] France ............................... 80 07212

[51] Int. Cl.³ ........................ F16K 3/32; F16K 11/06
[52] U.S. Cl. .......................... 137/625.29; 137/625.46;
 137/375; 123/41.09; 236/34.5
[58] Field of Search ..................... 137/625.29, 625.46,
 137/375; 123/41.09; 236/34.5

[56] References Cited

U.S. PATENT DOCUMENTS

| 311,657 | 2/1885 | Hewitt | 137/625.29 |
| 638,362 | 12/1899 | Seahorn | 137/625.29 |
| 2,540,229 | 2/1951 | Alessandro | 137/625.29 |
| 2,961,003 | 11/1960 | Shafer et al. | 137/624 |

FOREIGN PATENT DOCUMENTS

| 2804722 | 2/1978 | Fed. Rep. of Germany . |
| 254741 | 9/1927 | Italy ............................... 137/625.46 |

*Primary Examiner*—Arnold Rosenthal
*Attorney, Agent, or Firm*—Eyre, Mann, Lucas & Just

[57] ABSTRACT

A heating cock for a motor vehicle, comprising a cylindrical shell rotatably mounted about its axis in half-casings carrying fluid supply pipes and fluid return pipes, said cock allowing in its closed condition, connecting directly a supply pipe to a return pipe, the path of travel of the fluid in the shell being thermally insulated from the other pipes.

15 Claims, 17 Drawing Figures

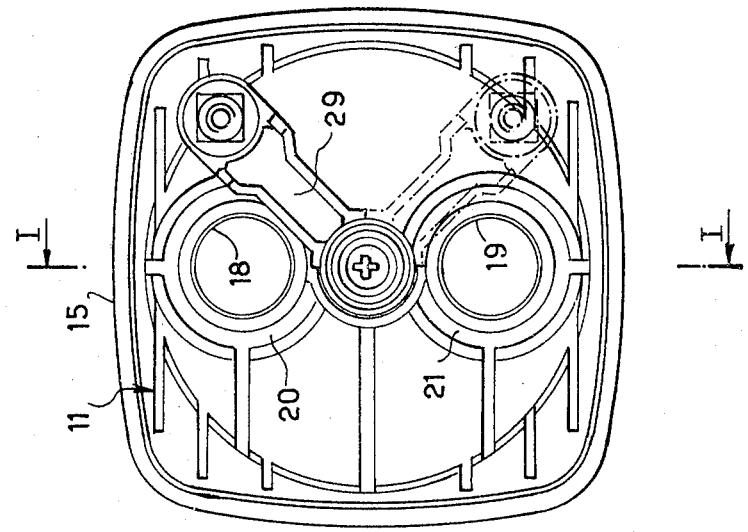
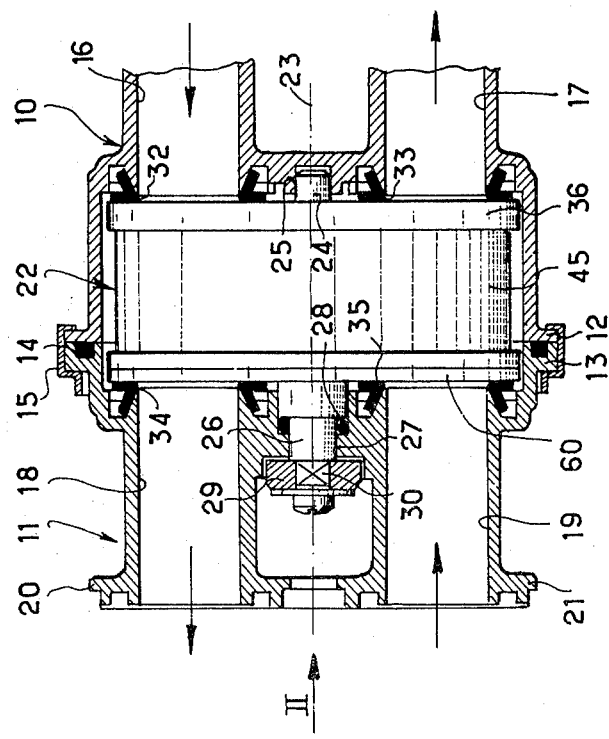

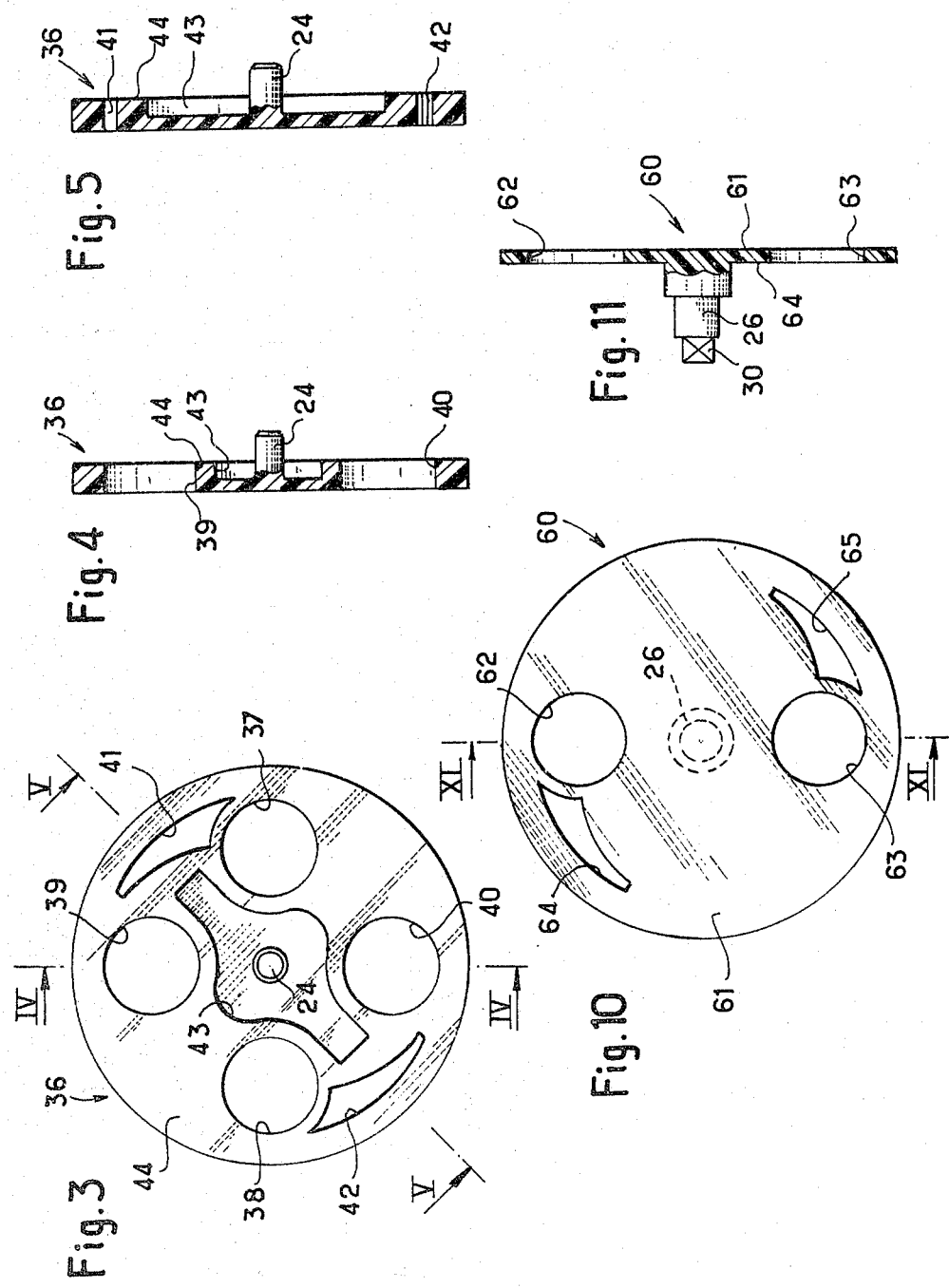

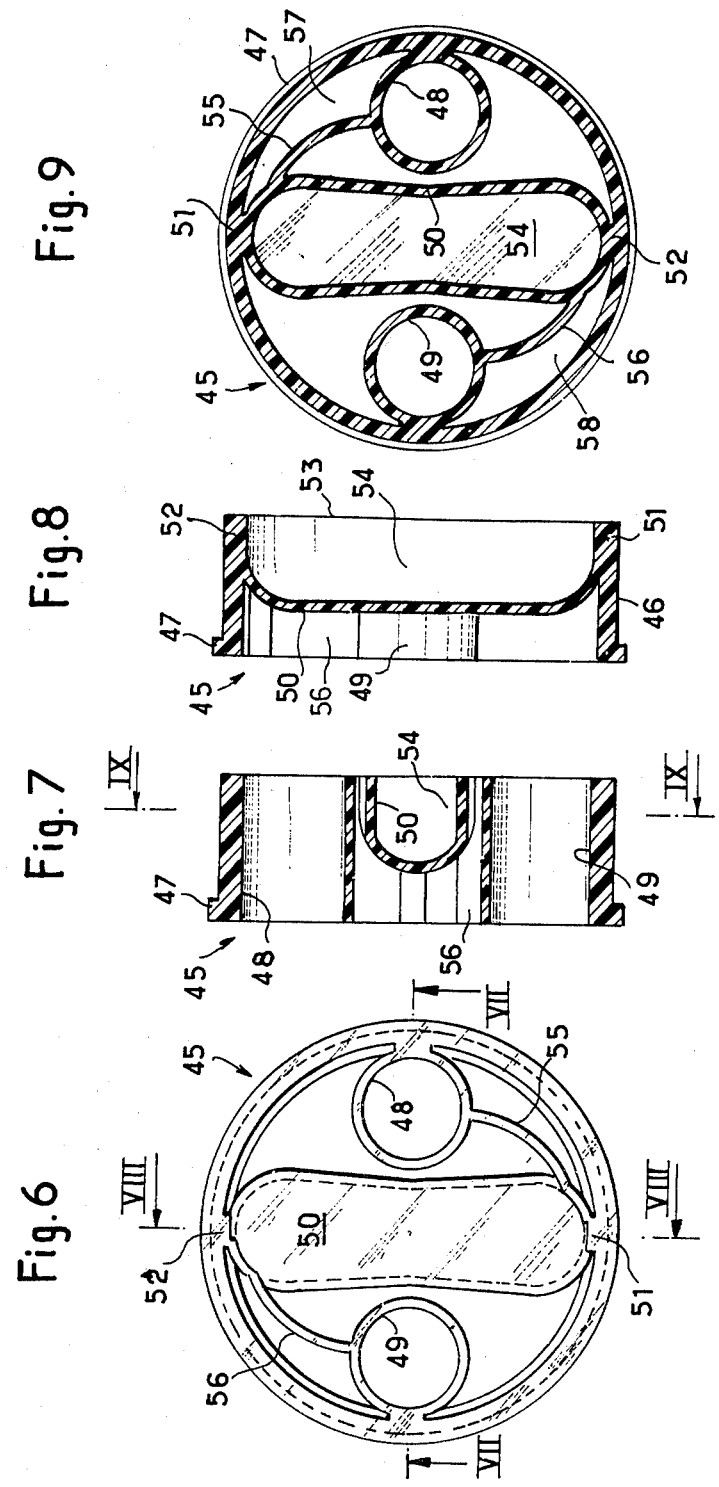

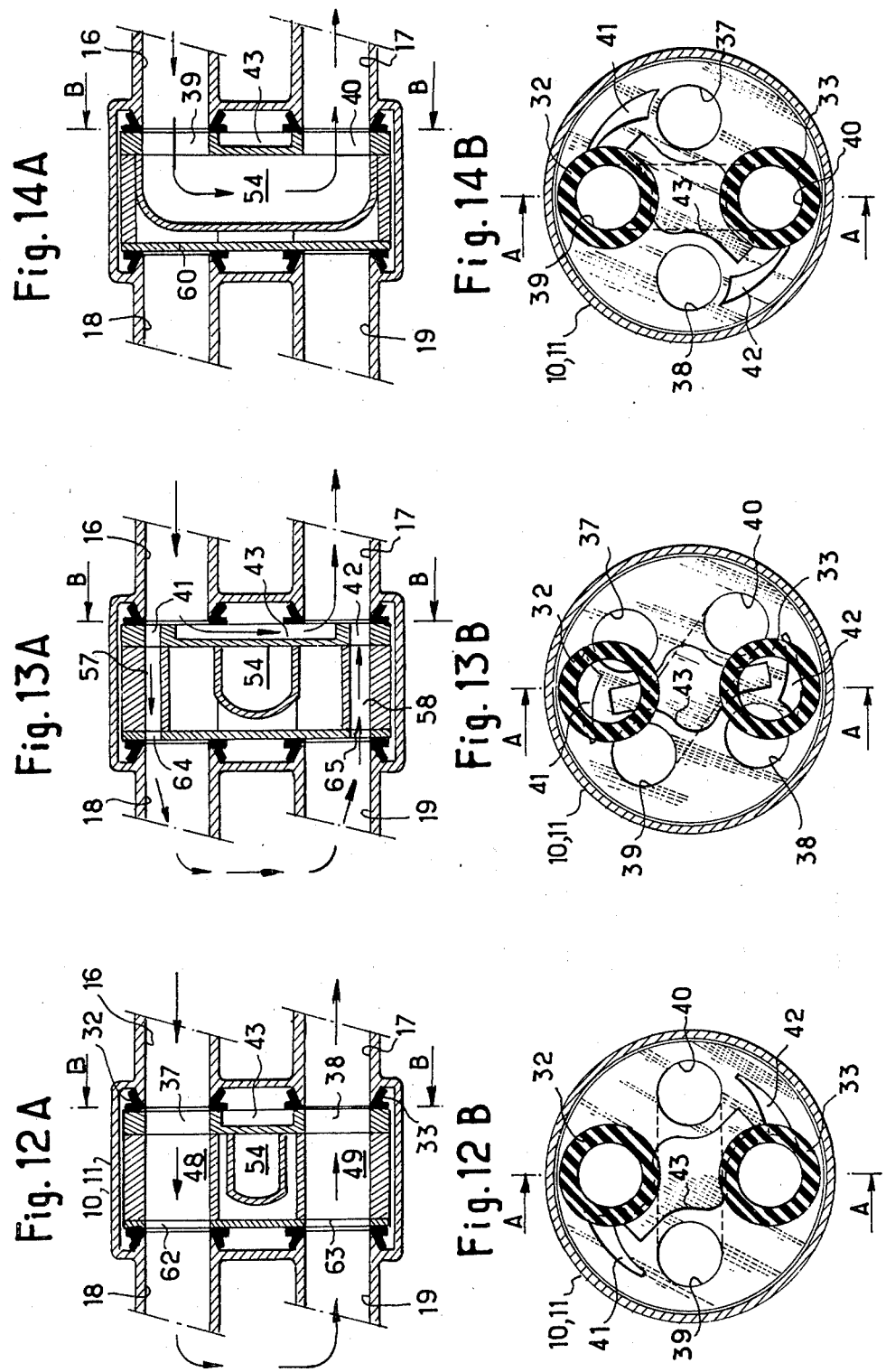

HEATING CONTROL COCK

FIELD OF THE INVENTION

The present invention relates to a cock adapted in particular to control a heating circuit in the passenger space of a motor vehicle.

BACKGROUND OF THE INVENTION

It is known that such a circuit comprises a heat exchanger through which flows the air thereafter introduced in the passenger space, and supplied by the hot engine cooling liquid (generally water). For controlling the heating, its has been proposed to place on the liquid supply and return pipes a cock which can be either in an opened condition in which the hot liquid circulating in the supply pipe flows through the cock, then in the exchanger, and then back through the cock in order to reach the return pipe, or in a closed condition in which the hot liquid circulating in the supply pipe flows in a by-pass channel formed in the cock and back directly in the return pipe, without passing through the exchanger, or again in intermediate conditions in which the hot liquid circulating in the supply pipe flows partly through the cock for supplying the exchanger, and partly through the cock by-pass channel for flowing back directly to the return pipe, thereby providing a progressive control of the vehicle passenger space heating.

In some of such known cocks, the flow of the hot fluid towards the exchanger and/or towards the return pipe via the by-pass channel is controlled by a disc formed with holes and interposed, inside the cock body, between the openings of the pipes into the cock body. Thus, in the closed condition of the cock, a face of said disc is in direct contact with the hot liquid, while its other face is in contact with the liquid which is filling the heat exchanger. The thermal exchange going on through the disc is sufficient for substantially increasing the temperature of the liquid filling the heat exchanger, which is particularly unpleasant for the persons in the vehicle when the weather is hot: the temperature of the air which reaches the inside of the passenger space after having passed through the exchanger which is then, in principle, not supplied, is higher than the outer temperature and heats up the passenger space in an undesirable manner.

OBJECTS AND SUMMARY OF THE INVENTION

The object of the present invention is precisely a cock of said type which is not exhibiting such a disadvantage.

The invention proposes a cock, mounted between the ends of four pipes comprising, on one side of the cock, first fluid supply and return pipes, and on the other side of the cock second fluid supply and return pipes, whereby said cock can assume an open condition in which the first pipes are not in mutual communication but communicate respectively with the second pipes, a closed condition in which it closes the second pipes and sets the first pipes in mutual communication, and intermediate conditions in which the first pipes communicate partly with each other and partly with the respective second pipes, characterized in that it comprises a cylindrical shell, rotatably and sealingly mounted about its axis between the ends of the pipes, and comprising at least two longitudinal passages setting in communication, in the opened condition, on the one hand the first and second supply pipes, and on the other hand the first and second return pipes, and a by-pass channel setting in communication exclusively the first pipes in the total closed condition of the shell, said by-pass channel being thermally insulated from the ends of the second pipes.

Thus, in the closed condition of the cock, the hot liquid which circulates in the first pipes and in the by-pass channel cannot heat the liquid which is in the second pipes, which therefore remains at a constant temperature, which is the outer temperature in the case where the cock controls the hot liquid supply of a heat exchanger in the heating circuit of a motor vehicle passenger space.

Of course, the cock according to the invention can be used in other branches of the technique, whenever it is necessary or advantageous to thermally insulate fluid pipes mutually connected by means of a flow rate control cock.

BRIEF DESCRIPTION OF THE DRAWINGS

In the following description which is given by way of example, reference is made to the accompanying drawings wherein:

FIG. 1 is a longitudinal cross-sectional view of a cock according to the invention, along line I—I of FIG. 2, FIG. 2 is a view in the direction of arrow II of FIG. 1, FIG. 3 is a front view of a first disc of the cock shell, FIGS. 4 and 5 are sectional views, respectively along lines IV—IV and V—V of FIG. 3, FIG. 6 is a front view of a second disc of the cock shell, FIGS. 7 and 8 are sectional views, respectively along lines VII—VII and VIII—VIII of FIG. 6, FIG. 9 is a sectional view along line IX—IX of FIG. 7, FIG. 10 is a front view of a third disc of the cock shell, FIG. 11 is a sectional view along line XI—XI of FIG. 10, and FIGS. 12A, 12B, 13A, 13B, 14A, 14B are schematic views, respectively in longitudinal cross-section along line A—A and in a transverse cross-section along line B—B, showing the operation of the cock according to the invention.

The cock according to the invention, shown in FIG. 1 and 2, is comprised of two half-casings or half-bodies 10 and 11, each being formed with an annular connection flange 12, 13, mounted against each other in a close fit with interposition of a seal 14, by means of tightening collar 15. At its end which is opposite the flange 12, the half-casing 10 comprises two parallel cylindrical pipes 16, 17 the axis of which is perpendicular to the plane of flange 12, and which are connected to an engine cooling water circuit, the pipe 16 forming for example the supply pipe, while pipe 17 is forming the return pipe.

Likewise, the half-body 11 comprises two pipes 18 and 19 extending respectively in the prolongation of pipes 16 and 17, and forming supply pipes to a heat exchanger and return pipes from the heat exchanger, as is shown by the arrows. The pipes 18 and 19 are in fact short pipe sections ending into an annular connection flange 20, 21 respectively.

A cylindrical shell, designated by numeral reference 22, is rotatably mounted about its central axis 23 in the inner cylindrical space defined by the half-casings 10 and 11 when assembled to each other. To this effect, the shell 22 is formed, on its flat face turned towards pipes 16 and 17, with a central pin 24 housed inside an axial blind hole 25 in the wall of the half-casing 10. At its opposite end, the shell 22 is formed with a driving axial shaft 26 rotatably and sealingly mounted in a bearing 27 of the half-casing 11, with the interposition of a seal 28. At the free end of shaft 28 is mounted an operating lever 29, rigidly connected to the shaft 26 by means of a driving square 30 in order to rotate with the shaft, the lever 29 extending towards the outside of the half-casing 11, perpendicularly to shaft 26, between the two pipes 18 and 19 which are formed with abutment shoulders limiting to 90° the stroke of lever 29. The lever 29 is driven in rotation by a cable, via a control member generally situated on the instrument board of the vehicle.

The cylindrical shell 22, housed inside the cylindrical space defined by the half-casings 10 and 11 between the openings of pipes 16, 17, 18 and 19, engages with its end faces annular seals 32, 33, 34 and 35, formed with lips and respectively mounted on the frustoconical ends of the pipes 16, 17, 18 and 19 which open into the sides of the half-casings 10 and 11.

The cylindrical shell 22 is formed, in this embodiment, of three coaxial discs, stacked onto each other and rigidly connected to each other, and which will be described in more detail with reference to FIG. 3 to 11.

The first disc 36, situated on the side of the first fluid supply and return pipes 16 and 17, and shown in FIG. 3 to 5, is a plane disc with circular contour, formed with four holes or through-going cylindrical passages 37, 38, 39 and 40 respectively, positioned at 90° relative to each other, and at an equal distance from the central disc 36. The distance from the centres of said holes to the centre of disc 36 is equal to the distance from the axes of the cock pipes 16, 17, 18 and 19 and the axis 23 of shell 22. The cross-sectional surface area of said holes is substantially equal to that of pipes 16, 17, 18 and 19. Between the consecutive holes 37 and 39 and between the consecutive holes 38 and 40 are formed two through openings 41, 42, diametrically opposite and symmetrical relative to the centre of disc 36, and having substantially the shape of a scimitar blade. Generally, the surface area of the openings 41, 42 decreases progressively in the direction from hole 37 to hole 39 and from hole 38 to hole 40 respectively.

A cavity 43 which is not through-going is formed as a recess in face 44 of disc 36 which is the outer face turned towards pipes 16 and 17 when the shell 22 comprising the disc 36 is mounted on the cock. The cavity 43 extends radially, between the openings 41 and 42, symmetrically relative to the centre of disc 36. The median portion of opening 43 is bulging or rounded about the aforementioned axial pin 24 of shell 22, which is rigidly connected to the bottom of cavity 43, in the centre of disc 36.

As will be seen from the following, the diametrically opposite holes 37 and 38 are used for establishing a direct communication between pipes 16 and 18 on the one hand, and between pipes 17 and 19 on the other hand, the holes 39 and 40 forming the inlets of a total by-pass channel allowing the passage of the fluid directly from pipe 16 to pipe 17 when the cock is in a closed condition, the openings 41, 42 allowing a partial communication between pipes 16 and 18 on the one hand and pipes 17 and 19 on the other hand when the cock is in the intermediate conditions, and cavity 43 forms a partial by-pass channel directly connecting pipe 16 to pipe 17 in the intermediate conditions of the cock.

The second disc 45, or median disc of shell 22, as shown in FIG. 6 to 9, comprises a cylindrical skirt 46 formed at one end with an outer annular flange 47 the outer diameter of which is larger than that of skirt 46 and equal to that of the first disc 36.

Two sections of tubes 48 and 49, diametrically opposite, corresponding to the holes 37 and 38 of the first disc and which will be in alignment with the latter, are formed by inner webs integrally moulded with the skirt 46. From the skirt 46 depends also an inner web 50, trough-shaped, extending perpendicularly to the diameter passing by the centres of the sections of tubes 48 and 49, and extending diametrically inside skirt 46 by being connected to the latter via its two ends 51 and 52. The channel 54 formed by the web 50 opens on a face 53 of disc 45, and its depth is smaller than the height of the second disc 45. The disc 45 will be applied, via its face 53, on disc 36. At the level of said face 53 of disc 45, the ends 51 and 52 of the web 50 are substantially cylindrical and correspond to the holes 39 and 40 of the first disc 36, with which they will be in alignment when the two discs will be applied against each other. Under such conditions, the holes 39 and 40 will therefore open inside the channel 54 formed by the web 50, and will form with the latter a total by-pass channel directly connecting the first pipe 16 with the first pipe 17 when the cock is in its closed condition.

The sections of tube 48 and 49 are respectively connected to the ends 51 and 52 of the web 50 via an oblique wall 55, 56 extending over the whole height of disc 45, and defining with the cylindrical skirt 46 and a portion of the corresponding section of tube 48, 49, an inner passage 57, 58 of identical shape to that of the openings 41, 42 of the first disc 36. When the discs 36 and 45 are axially stacked, the openings 41 and 42 are respectively axially superimposed onto passages 57 and 58.

The third disc 60, shown in FIGS. 10 and 11, is a plane disc of small thickness, having substantially the same outer diameter as the annular flange 47 of the second disc 45, and which is provided for being applied, via its face 61, on the face of the second disc 45 formed with the flange 47.

The third disc 60 is formed with two through holes 62, 63, diametrically opposite, identical to holes 37 and 38 of the first disc, and provided for coming in alignment with the latter when the discs are stacked for forming the shell 22. Likewise, the third disc 60 is formed with two openings 64 and 65, symmetrical relative to the centre of disc 60, identical to openings 41 and 42 of the first disc 36, and provided for being in alignment with the latter when the discs are axially stacked.

On its face 64 which is opposite its face 61, the third disc 60 comprises the aforementioned shaft 26 ending into the driving square 30.

For forming the cylindrical shell 22, the three discs 36, 45 and 60 are axially stacked and fixed to each other, for example by gluing or soldering. In the shell, the cylindrical holes 37 and 38 of the first disc 36 are aligned with the sections of tube 48 and 49 of the second disc 45 and with the cylindrical holes 62 and 63 of the third disc 60 respectively. The openings 41 and 42 of the first disc are aligned with the passages 57 and 58 of the second disc, and with the openings 64 and 65 of the third disc, respectively. The cylindrical holes 39 and 40 of the first disc 36 open at the ends of the total by-pass channel 54 formed in the second disc 45.

The shell 22 is mounted for example in the half-casing 10, the half-casing 11 being next mounted on the half-casing 10 and fixed to it via collar 15, the operating lever 29 is put in position on the driving square 30 at the end of the shaft 26 and maintained in position by means of a screw and a washer.

The operation of the cock will now be described with reference to FIGS. 12A to 14B.

In FIGS. 14A and 12B, the cock is shown in its condition of complete opening. Under such conditions, the liquid arriving through the first pipe 16 flows directly through the shell 22 via the cylindrical hole 37 of the first disc 36, the section of tube 48 of the second disc 45 and the cylindrical hole 62 of the third disc 60 which, in this condition, are aligned with the first supply pipe 16 and the second supply pipe 18. By flowing through the second pipe 18, the liquid reaches the heat exchanger from where it flows back through the secon pipe 19. It passes then through the cylindrical hole 63 of the third disc 60, the section of tube 49 of the second disc and the cylindrical hole 38 of the first disc, and returns, via pipe 17, to the engine cooling liquid circuit.

In this condition of complete opening of the cock, the liquid brought by pipe 16 cannot flow in the partial by-pass duct 43 nor in the total by-pass duct 54, nor in the partial communication ducts emerging into the openings 41 and 42 since these ducts are not in register with the first pipe 16.

In the condition of partial opening of said cock, as shown in FIGS. 13A and 13B, the cylindrical shell 22 has been turned over slightly less than ⅛ of turn relative to its position of FIGS. 12A and 12B. The ends of the partial by-pass duct 43 are then in register with the ends of the first pipes 16 and 17, so that part of the liquid brought by the first pipe 16 will flow through the partial by-pass duct 43 and come out directly in the return pipe 17. A portion of the openings 41 and 42 is also in register with the ends of pipes 16 and 17 respectively. A portion of the liquid brought by the first pipe 16 will then flow through the opening 41 of the first disc, the passage 57 of the second disc and the opening 64 of the third disc, for reaching the pipe 18 and circulate through the exchanger, flow out of the exchanger via pipe 19, pass through opening 65 of the third disc, the passage 58 of the second disc and the opening 42 of the first disc for finally reaching the return pipe 17.

In this intermmediate condition, a portion of the liquid brought by the first pipe 16 can also flow, as in the condition of complete opening of the cock, through the cylindrical hole 37 of the first disc, the section of tube 48 of the second disc and the cylindrical hole 62 of the third disc, for following the same path as previously.

The condition completely closed of the cock has been shown in FIGS. 14A and 14B, wherein the cylindrical shell 22 has been turned over a quarter of turn from the position shown in FIGS. 12A and 12B. The end of the supply pipe 16 is then in register with the cylindrical hole 39 of the first disc, which opens into the total by-pass channel 54, thereby bringing the liquid back in the return pipe 17 through the cylindrical hole 40 of the first disc.

It can be seen that the total by-pass channel 54 is insulated from the third disc 60 by a space filled with air, tightly closed relative to the third disc 60, the air playing the part of a thermal insulation between the channel 54 and the ends of the pipes 18 and 19 which are filled with liquid. Thus, the circulation of a hot liquid in channel 54 cannot bring about a substantial increase of temperature of the liquid which is in pipes 18 and 19.

Of course, a thermally insulating material could be used instead of air for filling the space between the channel 54 and the third disc 60.

What is claimed is:

1. A control cock operative to be mounted between the ends of four pipes, said pipes comprising first fluid supply and return pipes on one side of the cock and second fluid supply and return pipes on the other side, said control cock comprising a cylindrical shell rotatably and sealingly mounted about its axis between the ends of the pipe, said cylindrical shell being rotatable through intermediate conditions between a fully opened position and a fully closed position; said cylindrical shell having disposed therein at least two longitudinal passages which in said fully opened position enable fluid communication between said first and second supply pipes and said first and second return pipes, respectively; said cylindrical shell having a first by-pass channel for enabling fluid communication only between said first fluid supply and return pipes when said cylindrical shell is in said closed position, said first by-pass channel being separated from the ends of the second pipes by a confined space at least partially surrounding the by-pass channel, said space containing a thermal insulating agent; and said cylindrical shell having a second by-pass channel for enabling partial fluid communication between said first fluid supply and return pipes as well as two through-going openings for enabling partial fluid communication between said first and second fluid supply pipes and said first and second fluid return pipes, respectively, while the shell is disposed intermediately between the fully opened and fully closed position.

2. A cock according to claim 1, wherein the thermal insulating agent is air.

3. A cock according to claim 1, wherein the second by-pass channel is without communication with the first by-pass channel.

4. A cock according to claim 1 wherein the cross section of the second by-pass channel is less than that of the first by-pass channel.

5. A cock according to claim 1, wherein the surface in cross-section of the through-going openings is less than that of the said cylindrical passages.

6. A cock according to claim 1, wherein the cross-section of the cylindrical passages is substantially equal to that of said pipes and to that of the first by-pass channel.

7. A cock according to claim 1, wherein the shell is formed of several discs axially stacked and fixed to each other.

8. A cock according to claim 7, wherein the shell comprises: a first disc, situated on the side of the first pipes, in which are formed the second by-pass channel and four through-going identical passages angularly spaced from each other; a second disc or median disc, in which are formed two through-going passages axially aligned with two through-going passages of the first disc, and the first by-pass channel the ends of which are in alignment with the two other through-going passages of the first disc; and a third disc situated on the side of the second pipes and comprising two through-going passages in axial alignment with the two through-going passages of the second disc.

9. A cock according to claim 8, wherein the first by-pass channel is formed as a recess on the face of the second disc which is applied on the first disc and is partly closed between its ends by the corresponding face of the first disc.

10. A cock according to claim 9, wherein the second disc comprises a cylindrical skirt integral with an inner web forming the first by-pass channel and defining a hollow space about said channel, which is tightly closed by the third aforementioned disc.

11. A cock according to claim 8, wherein the aforementioned though-going openings are formed through the three discs.

12. A cock according to claim 8, wherein the discs are made of a plastics material.

13. A cock according to claim 1, wherein the said shell is rigidly connected, at its end adjacent the second pipes, to an axial shaft rotatably supported in bearings of a casing containing the shell, the end of said shaft being rigidly connected to an operating lever of the shell.

14. The cock of claim 1 wherein the through-going openings have a cross-section which progressively decreases in the direction from the opened condition to the closed position.

15. The cock of claim 1 wherein the shell moves from the fully opened position to the fully closed position in one quarter of a full turn.

* * * * *